(12) United States Patent
Uehara et al.

(10) Patent No.: US 7,942,749 B2
(45) Date of Patent: May 17, 2011

(54) DAMPER MECHANISM

(75) Inventors: Hiroshi Uehara, Osaka (JP); Hiroyoshi Tsuruta, Osaka (JP); Hirotaka Fukushima, Osaka (JP); Masakazu Kamiya, Aichi (JP); Masaru Ebata, Aichi (JP)

(73) Assignee: Exedy Corporation, Osaka (JP)

( * ) Notice: Subject to any disclaimer, the term of this patent is extended or adjusted under 35 U.S.C. 154(b) by 376 days.

(21) Appl. No.: 12/281,933

(22) PCT Filed: Mar. 12, 2007

(86) PCT No.: PCT/JP2007/054824
§ 371 (c)(1),
(2), (4) Date: Sep. 5, 2008

(87) PCT Pub. No.: WO2007/105684
PCT Pub. Date: Sep. 20, 2007

(65) Prior Publication Data
US 2009/0069098 A1    Mar. 12, 2009

(30) Foreign Application Priority Data
Mar. 14, 2006   (JP) .................................. 2006-069996

(51) Int. Cl.
*F16F 15/121* (2006.01)
(52) U.S. Cl. ...................................................... 464/68.8
(58) Field of Classification Search .................. 464/68.7, 464/68.8; 192/213–213.22
See application file for complete search history.

(56) References Cited

U.S. PATENT DOCUMENTS

| 4,557,702 A | * | 12/1985 | Takeuchi ............. 192/213.22 X |
| 5,261,516 A | | 11/1993 | Friedmann |
| 5,322,474 A | * | 6/1994 | Hashimoto et al. .......... 464/68.7 |
| 5,988,343 A | | 11/1999 | Kleifges et al. |
| 6,047,804 A | | 4/2000 | Feldhaus et al. |
| 2006/0254875 A1 | | 11/2006 | Uehara et al. |

FOREIGN PATENT DOCUMENTS

| JP | H04-231757 A | 8/1992 |
| JP | 2005-188736 A | 7/2005 |
| JP | 2005-207553 A | 8/2005 |

* cited by examiner

*Primary Examiner* — Greg Binda
(74) *Attorney, Agent, or Firm* — Global IP Counselors, LLP (57) ABSTRACT

A damper mechanism (4) includes a first flywheel (2), an intermediate rotating body (44) arranged to be rotatable with respect to the first flywheel (2), a second flywheel (3) arranged to be rotatable with respect to the intermediate rotating body (44), a first damper (8) having a plurality of first coil springs (41) elastically coupling the first flywheel (2) and the intermediate rotating body (44) in a rotation direction, and a second damper (9) elastically coupling the intermediate rotating body (44) and the second flywheel (3) in the rotation direction and that begins operating at a torque that is lower than the minimum operating torque of the first damper (8). The first coil springs (41) are accommodated between the first flywheel (2) and the second flywheel (3) in a state of having been compressed in the rotation direction.

12 Claims, 7 Drawing Sheets

DAMPER MECHANISM

CROSS-REFERENCE TO RELATED APPLICATIONS

This U.S. National stage application claims priority under 35 U.S.C. §119(a) to Japanese Patent Application No. 2006-069996, filed in Japan on Mar. 14, 2006, the entire contents of which are hereby incorporated herein by reference.

TECHNICAL FIELD

The present invention relates to a damper mechanism, and more particularly to a damper mechanism that is used in a flywheel assembly equipped with a flywheel disposed so as to allow torque to be transmitted through an elastic member to a crankshaft.

BACKGROUND ART

A flywheel is mounted on the crankshaft of an engine in order to absorb vibrations caused by combustion fluctuations in the engine. A clutch device is provided on the transmission side in the axial direction of the flywheel. The clutch device includes a clutch disk assembly coupled to the input shaft of the transmission, and a clutch cover assembly that biases a friction coupling component of the clutch disk assembly to the flywheel. The clutch disk assembly has a damper mechanism to absorb and damp any torsional vibration. The damper mechanism has a coil spring or other such elastic member disposed so as to be compressed in the rotation direction.

Another known structure is one in which a damper mechanism is provided between the crankshaft and the flywheel, rather than a clutch disk assembly. In this case, the flywheel is located on the output side of a vibration system whose boundary is a coil spring, and inertia on the output side is greater than with a conventional setup. As a result, the resonance engine speed can be set lower than the idle speed, affording very good damping performance. Thus, a structure including a combination of a flywheel and a damper mechanism is a two-mass flywheel or a flywheel damper (see, for example, Japanese Laid-Open Patent Application H4-231757). A flywheel fixed to the crankshaft of an engine is called a first flywheel, while a flywheel that is coupled to the crankshaft via an elastic member and to which a clutch device is mounted is called a second flywheel.

SUMMARY OF THE INVENTION

A known example of a damper mechanism for this type of flywheel assembly is one in which an elastic member is disposed on the outer peripheral side, as discussed in Japanese Laid-Open Patent Application H4-231757. With this damper mechanism, for example, the elastic members are disposed in a free state so as to act in series, and torsional vibrations are absorbed and damped by damper characteristics being made of low stiffness and a wide torsion angle.

However, since centrifugal force acts on the elastic members on the outer peripheral side at high engine speeds, the elastic members on the outer peripheral side are pressed against the member disposed on this outer peripheral side, resulting in a high hysteresis torque. This hysteresis torque hinders the operation of the elastic members. Thus, at high engine speeds, the vibration damping performance of the damper mechanism is diminished.

In view of this, it has been proposed, for example, that in addition to elastic members on the outer peripheral side, elastic members also be disposed in a free state on the inner peripheral side, and that these elastic members act in series. With this damper mechanism, low stiffness and a wide torsion angle are achieved by the elastic members on the outer peripheral side, while the elastic members on the inner peripheral side, where hysteresis torque is less likely to be generated at high engine speeds, operate in an auxiliary manner to prevent a decrease in vibration damping performance.

Nevertheless, because of structural limitations, it is difficult to maintain a wide torsion angle with the elastic members on the inner peripheral side. Therefore, the torsion angle of the damper mechanism becomes narrower at high engine speeds, and the large torsional vibration generated at high engine speeds cannot be effectively absorbed with a conventional damper mechanism. For example, when the clutch is engaged, if the driver suddenly lifts off the accelerator pedal at high engine speeds, engine braking causes the damper mechanism to be driven backward, so that a large torsional vibration is inputted to the damper mechanism. At this point, since the elastic members on the outer peripheral side are not operated by centrifugal force as discussed above, the damper mechanism does not return adequately. In particular, if the relative rotation angle of the two flywheels is small, the elastic members approach a free state, and only a light load is generated in the direction of returning the first and second flywheels to their initial state. Therefore, this load cannot overcome the hysteresis torque, and the damper mechanism does not return adequately at high engine speeds. When return is inadequate, large torsional vibrations cannot be absorbed and damped by the elastic members on the inner peripheral side, the result being a pronounced drop in vibration damping performance.

It is an object of the present invention to allow adequate return at high engine speeds with a damper mechanism mounted in a flywheel assembly, and to improve vibration damping performance.

A damper mechanism according to a first aspect of the present invention is a damper mechanism for transmitting torque and for absorbing and damping torque fluctuations, including a first rotating member, a second rotating member that is disposed so as to be capable of relative rotation with respect to the first rotating member, a third rotating member that is disposed so as to be capable of relative rotation with respect to the second rotating member, a first damper that has a plurality of first elastic members that elastically couple the first rotating member and the second rotating member in the rotation direction, and a second damper that elastically couples the second rotating member and the third rotating member in the rotation direction, and begins operating at a torque that is lower than the minimum operating torque of the first damper. The first elastic members are provided to either the first rotating member or the second rotating member in a state of having been compressed in the rotation direction.

With this damper mechanism, since the first elastic members have been compressed in the rotation direction, the compression of the first elastic members is not begun until the input torque exceeds the minimum operating torque corresponding to the compressed state of the first elastic members, for example, with only the second damper operating so as to absorb and damp torsional vibration.

On the other hand, once the input torque exceeds the minimum operating torque, compression of the first elastic members is begun, and the first damper operates in series with the second damper. That is, unless a torque of at least the minimum operating torque is inputted, there is no relative rotation between the first rotating member and the second rotating member. In other words, the first elastic members cause a load that is larger than in the past to act on the first rotating member and the second rotating member in the direction of returning the relative rotation of the first rotating member and the second rotating member to the initial state. Therefore, with this damper mechanism, inadequate return at high engine speeds will occur less often, and vibration damping performance can be improved.

The damper mechanism according to a second aspect of the present invention is the damper mechanism of the first aspect, wherein the second damper has a plurality of second elastic members that is disposed on the inner peripheral side of the first elastic members and that elastically couples the second rotating member and the third rotating member in the rotation direction.

A damper mechanism according to a third aspect of the present invention is the damper mechanism of the first or second aspect, wherein the first damper begins operating during the operation of the second damper.

With this damper mechanism, the second damper is already operating when the first damper starts operating. In other words, the first damper is operating during the stopper operation of the second damper. As a result, there is less impact upon stopper operation of the second damper, and this reduces stopper damage and striking noise.

A damper mechanism according to a fourth aspect of the present invention is the damper mechanism of any of the first to third aspects, wherein one of the first rotating member and the second rotating member has a plurality of support components that support the ends of the first elastic members in the rotation direction. The other of the first rotating member and the second rotating member has a sliding component that is disposed on the outer peripheral side of the first elastic members and limits movement of the first elastic members outward in the radial direction. The first elastic members are disposed in an arc shape in a state of being compressed between adjacent support components in the rotation direction.

With this damper mechanism, since the first elastic members are disposed in an arc shape and in a compressed state between the support components, even when not subjected to centrifugal force, the first elastic members will attempt to move to the outer peripheral side, and the sliding of the sliding component and the first elastic members generates hysteresis torque. Specifically, even at low engine speeds when there is almost no centrifugal force, hysteresis torque can still be obtained from the sliding between the sliding component and the first elastic members. This means that even if the engine speed should be low, such as when the clutch is engaged at low engine speed, and this should cause resonance, so that a large torque fluctuation produces torsional vibration, this large torsional vibration can be effectively absorbed and damped.

A damper mechanism according to a fifth aspect of the present invention is the damper mechanism of the fourth aspect, wherein two or more of the first elastic members are accommodated between adjacent support components in the rotation direction. Spring seats that support the first elastic members and slide with the sliding component are disposed between the ends of adjacent first elastic members.

A damper mechanism according to a sixth aspect of the present invention is the damper mechanism of any of the first to third aspects, wherein the second rotating member has a plurality of support components that support the ends of the first elastic members in the rotation direction. The first rotating member has a plurality of contact components that are disposed at locations corresponding to the support components in the rotation direction and that are able to come into contact with the ends of the first elastic members, and a sliding component that is disposed on the outer peripheral side of the first elastic members and supports the first elastic members in the radial direction.ABroads are formed in the rotation direction between the contact components and the ends of the first elastic members.

Figure 1:
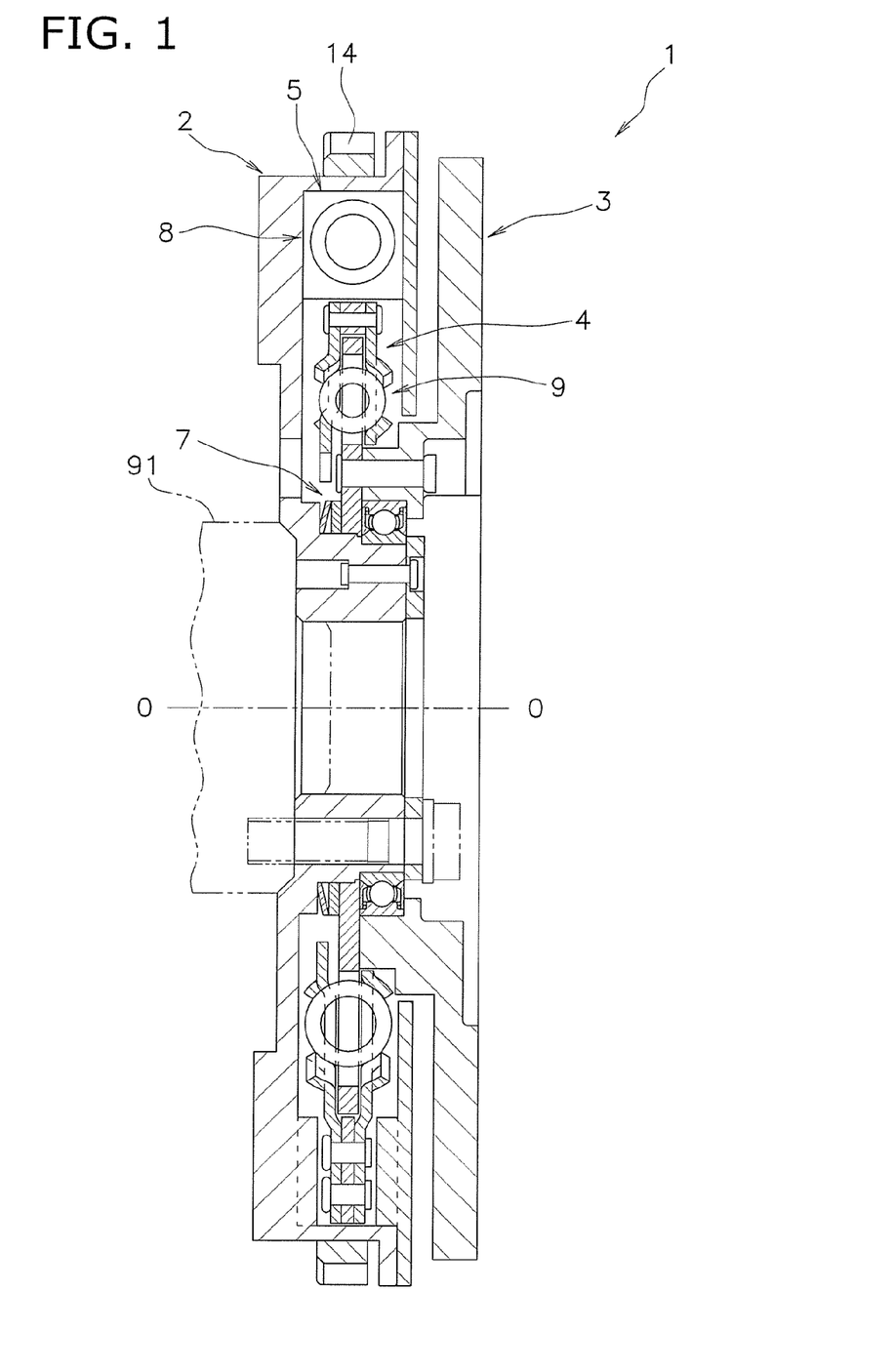
FIG. 1 is a simplified vertical cross-sectional view of a two-mass flywheel as an embodiment of the present invention.
Figure 2:
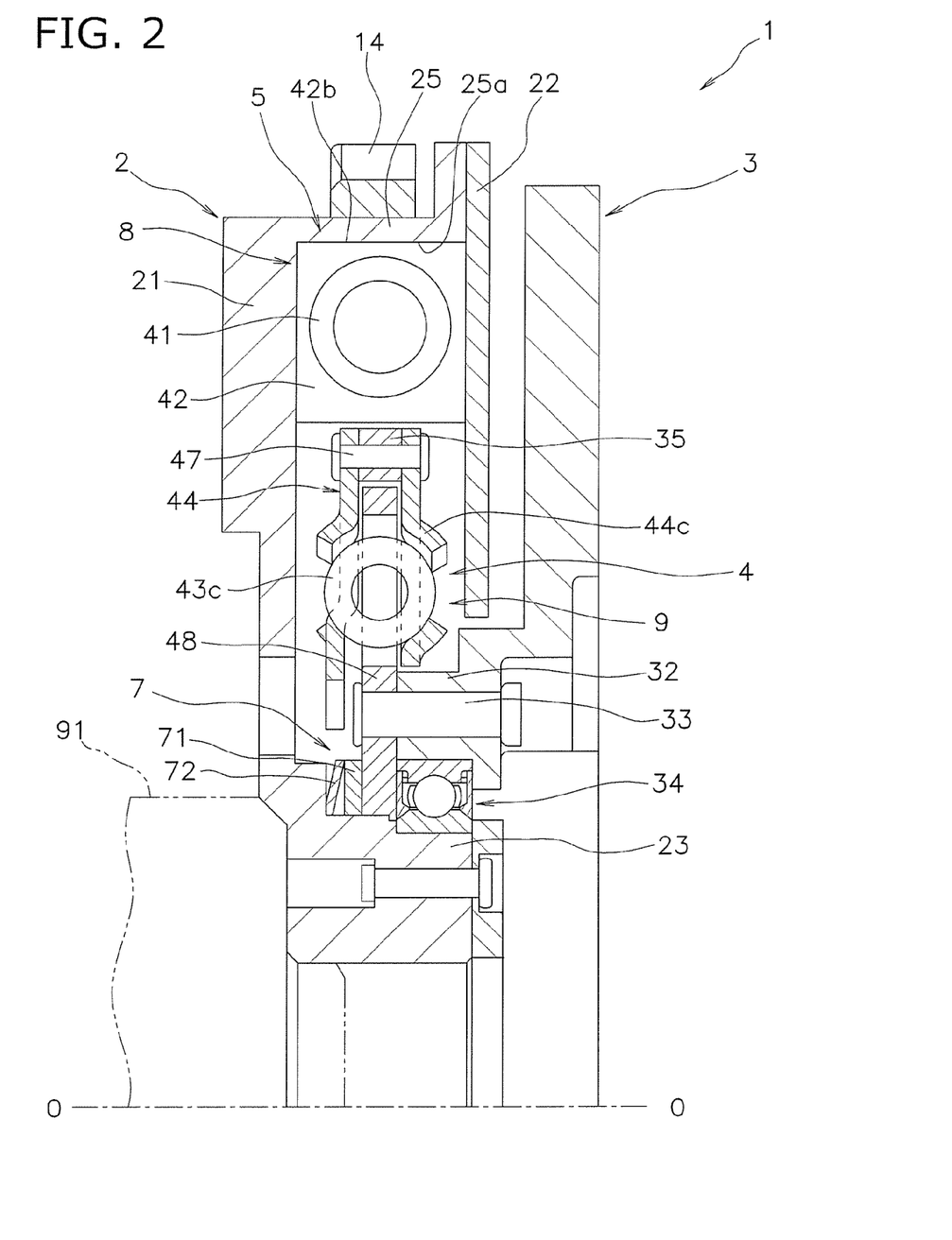
FIG. 2 is a detailed view of the upper portion of the two-mass flywheel shown in FIG. 1.
Figure 3:
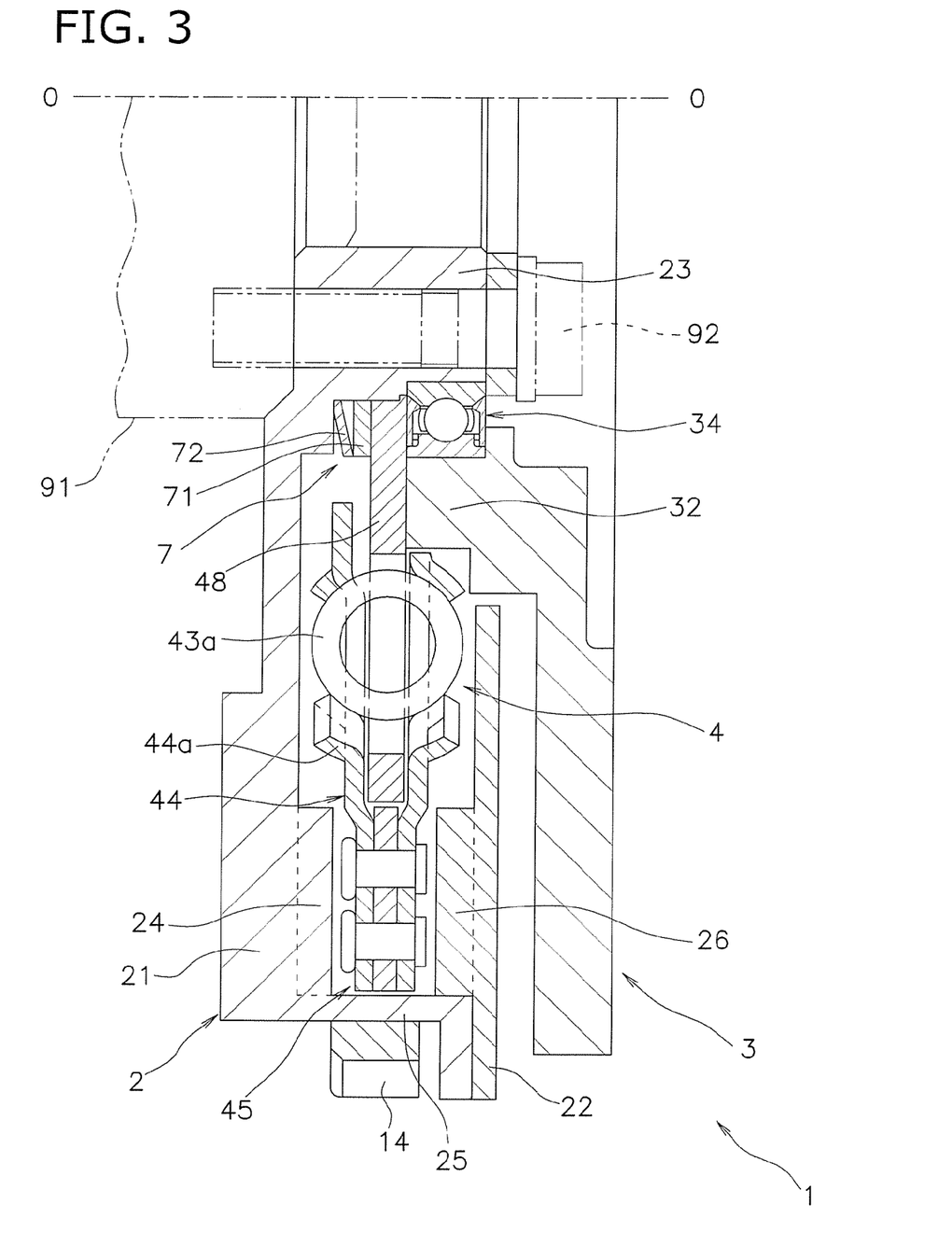
FIG. 3 is a detailed view of the lower portion of the two-mass flywheel shown in FIG. 1.
Figure 4:
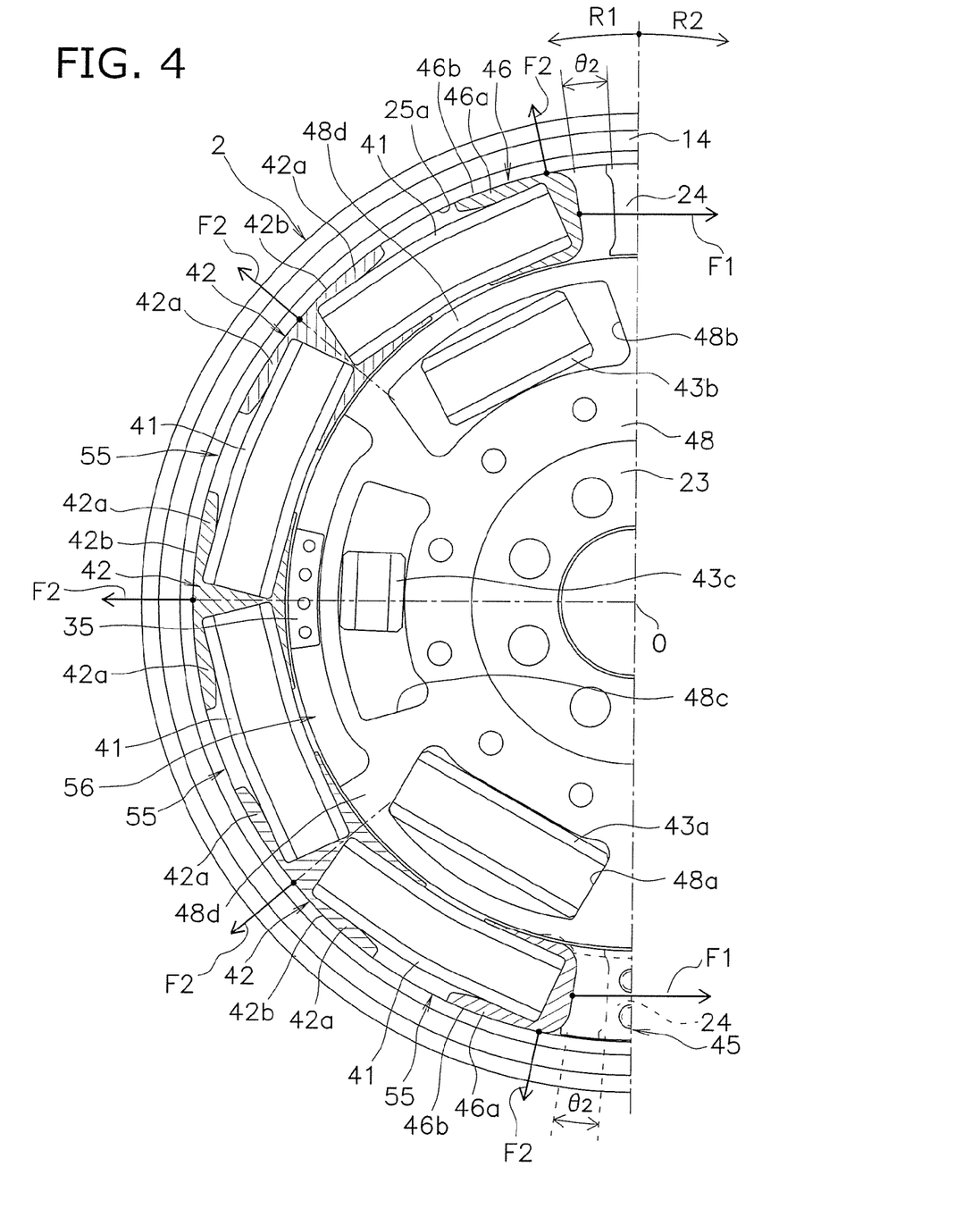
FIG. 4 is a partial elevational view of the two-mass flywheel.
Figure 5:
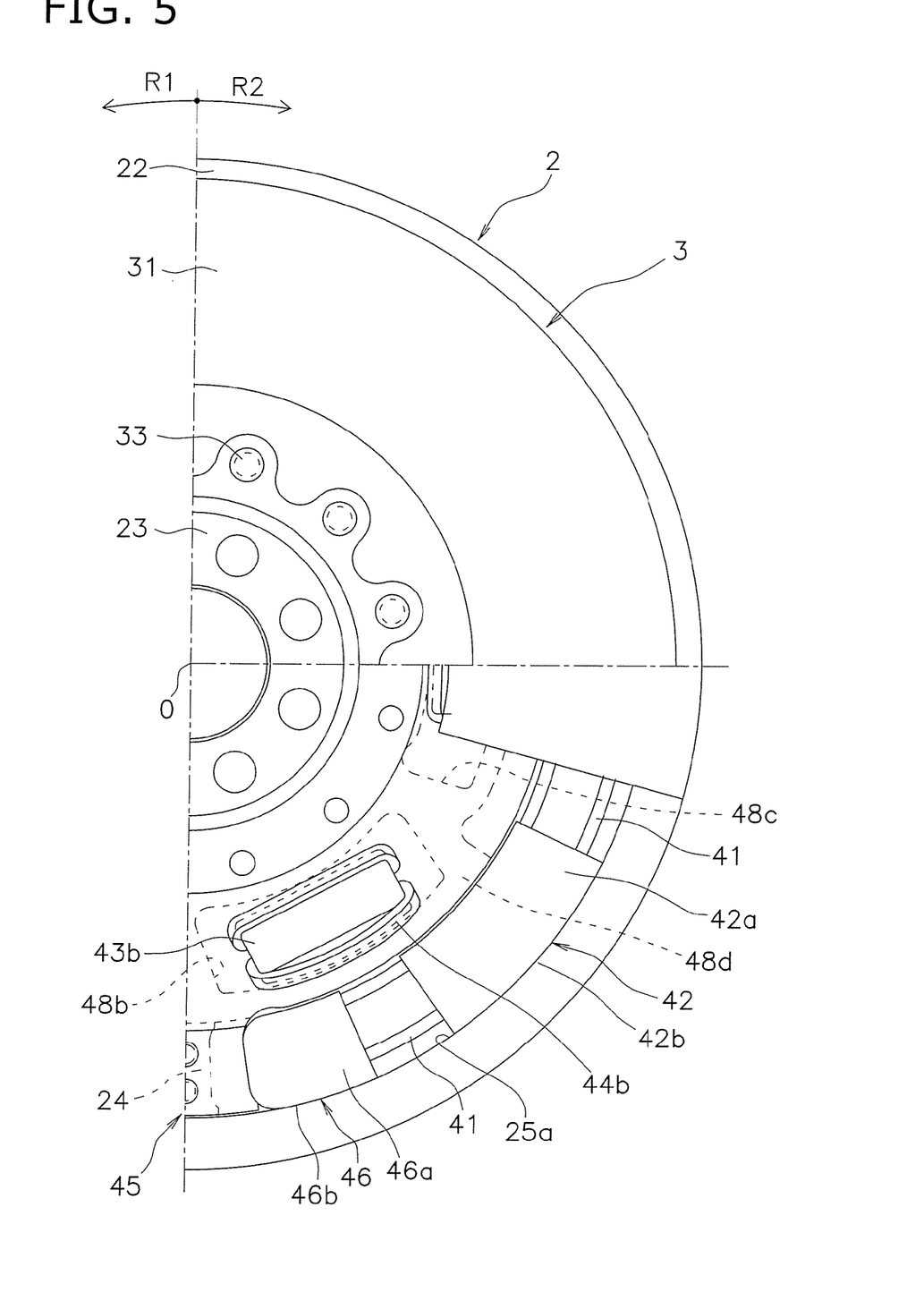
FIG. 5 is a partial elevational view of the two-mass flywheel.

DETAILED DESCRIPTION OF THE PREFERRED EMBODIMENT OF THE INVENTION (1) Configuration
1) Overall Structure The two-mass flywheel pertaining to the present invention will be described through reference to FIGS. 1 to 5. FIG. 1 is a simplified vertical cross section of a two-mass flywheel 1 as an embodiment of the present invention, FIG. 2 is a detailed view of the upper portion of FIG. 1, FIG. 3 is a detailed view of the lower portion of FIG. 1, and FIGS. 4 and 5 are simplified plan views of the two-mass flywheel 1. The O-O line in FIGS. 1 to 3 is the rotational axis of the two-mass flywheel 1 and the clutch. The engine (not shown) is disposed on the left side in FIGS. 1 to 3, and the transmission (not shown) on the right side. Hereinafter the left side in FIGS. 1 to 3 will be called the axial engine side, and the right side will be called the axial transmission side. The orientation of the arrow R1 in FIGS. 4 and 5 is the drive side (rotational positive side), and the orientation of the arrow R2 is the reverse drive side (rotational negative side).

As shown in FIG. 1, the two-mass flywheel 1 is a device for transmitting torque from a crankshaft 91 on the engine side, through a clutch (not shown), to an input shaft on the transmission side, and has a damper function for absorbing and damping torsional vibration. The two-mass flywheel 1 is mainly made up of a first flywheel 2 (as a first rotating member) fixed to the crankshaft 91, a second flywheel 3 (as a third rotating member) that is disposed so as to be capable of rotating relative to the first flywheel 2 and in which a clutch device (not shown) is mounted, a damper mechanism 4 that elastically couples the two flywheels 2 and 3 in the rotation direction, and a first friction generating mechanism 5 and a second friction generating mechanism 7 that impart resistance in the rotation direction between the two flywheels 2 and 3.

2) First Flywheel

The first flywheel 2 is a member for ensuring a large moment of inertia to the crankshaft 91 side, and as shown in FIG. 2, is made up of a first flywheel main body 21, which constitutes the main component, a ring gear 14 that is fixed to the outer peripheral side of the first flywheel main body 21, and an annular plate 22 that is fixed to the transmission side of the first flywheel main body 21. A first cylindrical component 23 is formed on the inner peripheral side of the first flywheel main body 21, and the first flywheel main body 21 is fixed to the distal end of the crankshaft 91 by bolts 92 via the first cylindrical component 23. A bearing 34 that rotatably supports the second flywheel 3 is mounted on the outer peripheral side of the first cylindrical component 23. A second cylindrical component 25, serving as a sliding component that accommodates first coil springs 41 (discussed below) on its inner peripheral side, is formed on the outer peripheral side of the first flywheel main body 21.

3) Second Flywheel

The second flywheel 3 is an annular and disk-shaped member, and is disposed on the axial transmission side of the first flywheel 2. A second cylindrical component 32 is formed on the inner peripheral side of the second flywheel 3, and the second flywheel 3 is supported so as to be capable of rotating relative to the first flywheel 2 by the bearing 34 via the second cylindrical component 32. A clutch device (not shown) is mounted on the axial transmission side of the second flywheel 3.

4) Damper Mechanism

The damper mechanism 4 is a mechanism for elastically coupling the first flywheel 2 and the second flywheel 3 in the rotation direction, and is made up of a first damper 8 that has low stiffness, a wide torsion angle, and high hysteresis torque, and a second damper 9 that acts in series with the first damper 8 and has low stiffness and low hysteresis torque. More specifically, as shown in FIGS. 2 to 4, the damper mechanism 4 is mainly made up of an annular intermediate rotating body 44 (as the second rotating member) being made of two plates, a plurality of first coil springs 41 (as the first elastic members) that elastically couple the first flywheel 2 and the intermediate rotating body 44 in the rotation direction, an annular output rotating body 48 (as the third rotating member) that is disposed between the two plates and fixed to the second flywheel 3, and a plurality of second coil springs 43a, 43b, and 43c (as the second elastic members) that elastically couple the intermediate rotating body 44 and the output rotating body 48 in the rotation direction.

Figure 6A:
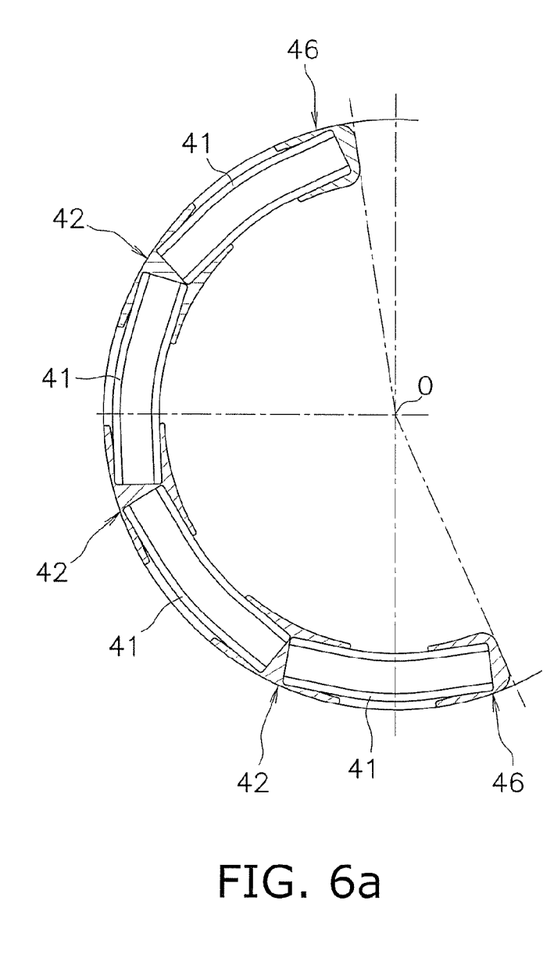
FIGS. 6a and 6b are partial cross-sectional views showing the states in which first coil springs of the two-mass flywheel are set.
Figure 6B:
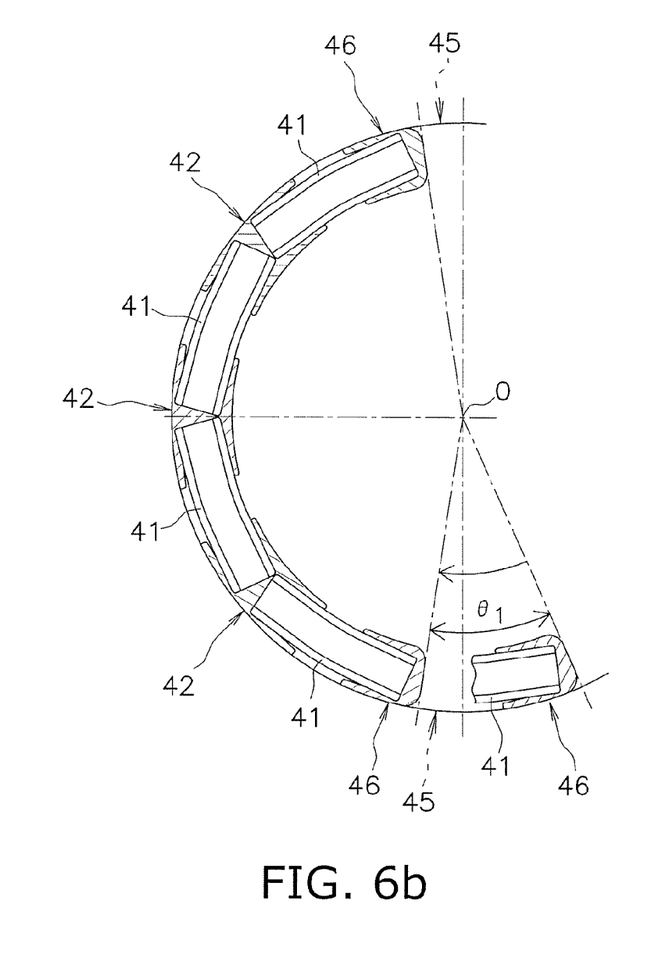
Figure 7A:
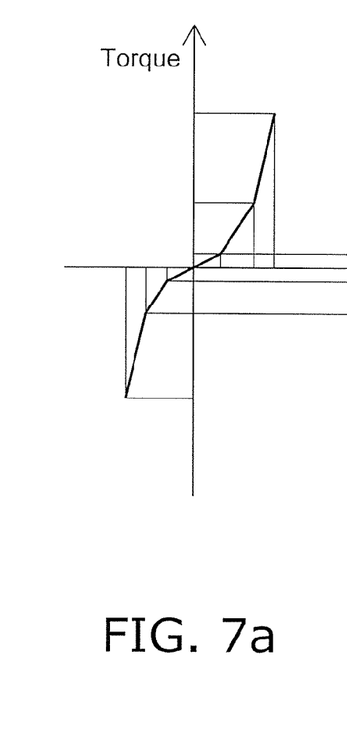
FIGS. 7a to 7c are graphs of the torsional characteristics of a damper mechanism of the two-mass flywheel.
Figure 7B:
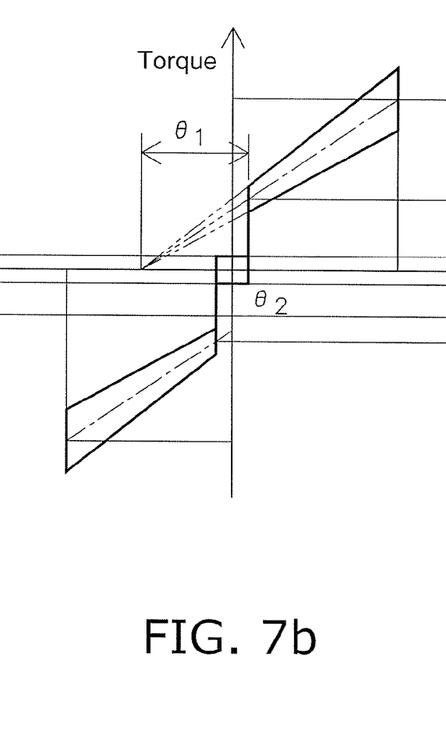
Figure 7C:
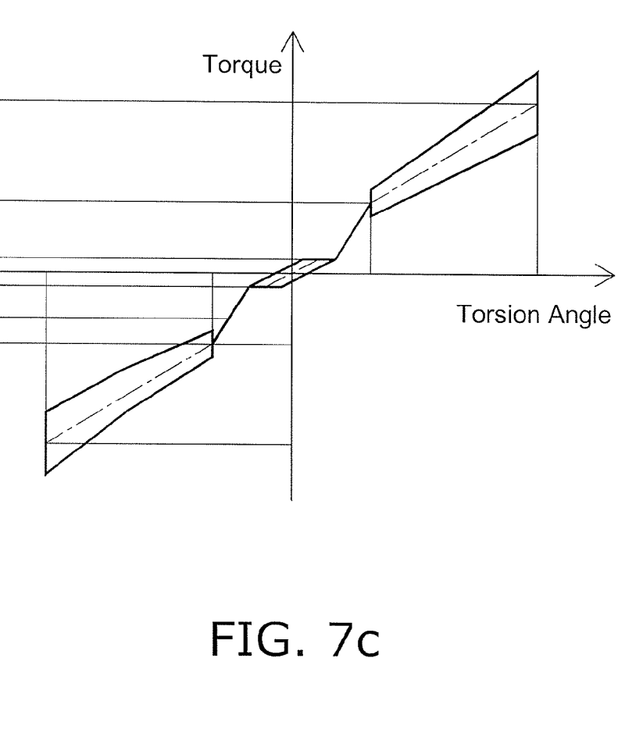

FIGS. 6a and 6b show the states in which first coil springs 41 are set, FIG. 7a is a graph of the torsional characteristics of the second damper 9, FIG. 7b is a graph of the torsional characteristics of the first damper 8, and FIG. 7c is a graph of the torsional characteristics of the damper mechanism 4.

4-1) First Damper

As shown in FIGS. 3 and 4, the intermediate rotating body 44 has two support components 45 that protrude on the outer peripheral side, and support components 44a, 44b, and 44c that support the second coil springs 43a, 43b, and 43c. Four first coil springs 41 are accommodated in series and in a state of having been compressed, between the support components 45 in the rotation direction. More specifically, first spring seats 46 that are able to come into contact with the support components 45 in the rotation direction are mounted at the ends of the first coil springs 41, and second spring seats 42 are disposed between the ends of the first coil springs 41. Four of the first coil springs 41 are disposed in series in an arc shape. As shown in FIGS. 6a and 6b, the four first coil springs 41 are set between the support components 45 in the rotation direction in a state of being compressed by an angle of θ1 (the state in FIG. 6b) from a free state (the state in FIG. 6a). That is, as shown in FIG. 4, a load F1 produced by a pre-load is always acting on the support components 45 from the first spring seats 46.

As shown in FIG. 4, the first spring seats 46 and the second spring seats 42 have cylindrical components 46a and 42a that cover the ends of the first coil springs 41. The cylindrical components 46a and 42a have contact faces 46b and 42b that are arc-shaped outward in the radial direction, and the contact faces 46b and 42b come into contact with the inner peripheral face 25a of the second cylindrical component 25 of the first flywheel main body 21. Also, the distal ends of the cylindrical components 46a and 42a of adjacent first and second spring seats 46 and 42 come into contact in the rotation direction, thereby realizing a first stopper mechanism 55 of the first damper 8.

As shown in FIGS. 3 and 4, two first protrusions 24 that are opposite the support components 45 in the axial direction are formed on the transmission side of the first flywheel main body 21, and two second protrusions 26 that are opposite the support components 45 are formed on the engine side of the plate 22. The first protrusions 24 and the second protrusions 26 are able to come into contact with the first spring seats 46 in the rotation direction.

The effect of the above configuration is that when the first flywheel 2 and the intermediate rotating body 44 rotate relative to one another, the first coil springs 41 are compressed in series in the rotation direction. At this point, since the first coil springs 41 have been set in a pre-compressed state, if the input torque to the first flywheel 2 is no more than the minimum operating torque (a specific value corresponding to the compression state of the first coil springs 41), the first flywheel 2 and the intermediate rotating body 44 rotate integrally, and when the input torque exceeds the minimum operating torque, compression of the first coil springs 41 begins. As a result, damper characteristics of low stiffness and a wide torsion angle are realized in the first damper 8, which includes the first coil springs 41 (see FIG. 7b).

As shown in FIG. 4, since the four pre-compressed first coil springs 41 are disposed in an arc shape, a combined load F2 acts outward in the radial direction on the first and second spring seats 46 and 42. Therefore, the cylindrical components 46a and 42a of the first and second spring seats 46 and 42 are pressed against the second cylindrical component 25 of the first flywheel 2, and a relatively high frictional resistance can be generated between the cylindrical components 46a and 42a and the second cylindrical component 25. This means that damper characteristics of relatively high hysteresis torque can be realized in the first damper 8 (see FIG. 7b). In particular, with this configuration, a constant hysteresis torque can be generated even in a state in which there is no centrifugal force. Therefore, the desired hysteresis torque can be obtained even at low engine speeds.

4-2) Second Damper

As shown in FIGS. 2 to 5, two each of three different kinds of second coil springs 43a, 43b, and 43c are disposed on the inner peripheral side of the first coil springs 41 so as to be opposite each other with the rotational axis in between. The second coil springs 43a, 43b, and 43c are accommodated in windows 48a, 48b, and 48c formed in the output rotating body 48, and are supported in the axial direction and the rotation direction by the support components 44a, 44b, and 44c of the intermediate rotating body 44. Gaps of different lengths are maintained in the rotation direction between the second coil springs 43a, 43b, and 43c and the windows 48a, 48b, and 48c so that the second flywheel 3 will operate in three stages. Also, a plurality of protrusions 48d is formed on the outer peripheral side of the output rotating body 48, and a stopper 35 fixed to the intermediate rotating body 44 is accommodated between the protrusions 48d in the rotation direction. When the intermediate rotating body 44 and the output rotating body 48 perform relative rotation of a specific angle, the protrusions 48*d* and the stopper 35 come into contact in the rotation direction. That is, a second stopper mechanism 56 that limits the range of operation of the second damper is made up of the protrusions 48*d* and the stopper 35.

With the above configuration, when the intermediate rotating body 44 and the output rotating body 48 rotate relatively, the second coil springs 43*a*, 43*b*, and 43*c* are sequentially compressed in the rotation direction, and when the relative rotation angle reaches a specific angle, the second stopper mechanism 56 causes the intermediate rotating body 44 and the output rotating body 48 to rotate integrally. As a result, damper characteristics of low stiffness can be realized, in which the torsional stiffness varies in three stages in the second damper 9 (see FIG. 7*a*). In this case, the gaps between the second coil springs 43*c* and the windows 48*c*, etc., are adjusted so that the timing of operation of the second coil springs 43*c*, which begins operating at the third stage, substantially matches the timing of operation of the first damper 8. That is, as shown in FIG. 7*c*, compression of the first coil springs 41 begins substantially simultaneously with the start of compression of the second coil springs 43*c*, and the first coil springs 41 and the second coil springs 43*c* act in series, with the intermediate rotating body 44 functioning as an intermediate member.

A friction washer 51 and a cone spring 52 are sandwiched in the axial direction between the first flywheel main body 21 and the inner peripheral part of the output rotating body 48, and the friction washer 51 generates a relatively low frictional resistance between the output rotating body 48 and the first flywheel 2. Thus, the second friction generating mechanism 7, which generates frictional resistance between the first flywheel 2 and the output rotating body 48, is formed by a friction washer 71 and a cone spring 72. This affords damper characteristics of relatively low hysteresis torque in the second damper 9.

Furthermore, as shown in FIG. 4, in the initial state an angle $\theta_2$ is maintained in the rotation direction between the first spring seats 46 and the first protrusions 24 and second protrusions 26. Therefore, if the relative rotation between the first flywheel 2 and the intermediate rotating body 44 is within the angle $\theta_2$, the first coil springs 41 are not compressed (see FIG. 7*b*), and in addition the four first coil springs 41 rotate relative to the first flywheel 2. Specifically, within a range from the initial state to the angle $\theta_2$, the first coil springs 41 are not compressed, and frictional resistance is generated between the second cylindrical component 25 and the first spring seats 46 and second spring seats 42. As a result, as shown in FIG. 7*c*, in addition to the hysteresis torque generated by the second friction generating mechanism 7, a relatively large hysteresis torque can be obtained from the first friction generating mechanism 5 near a torsion angle of 0°.

As is clear from the above description and the torsion characteristics in FIG. 7*c*, with this damper mechanism 4, the second damper 9, which is disposed on the inner peripheral side that in the past was only used in an auxiliary manner, functions as the main damper, and the first damper 8 disposed on the outer peripheral side functions as a damper for absorbing and damping large torque fluctuations.

(2) Operation and Effect

1) Torque Transmission

With this two-mass flywheel 1, torque from the crankshaft 91 of the engine is inputted to the two-mass flywheel 1 of the first flywheel 2, and is transmitted through the damper mechanism 4 to the second flywheel 3. More specifically, with the damper mechanism 4, since the first coil springs 41 are accommodated in a state of being pre-compressed, up to the minimum operating torque the first flywheel 2 and the intermediate rotating body 44 rotate integrally, while the intermediate rotating body 44 rotates relative to the output rotating body 48 and the second flywheel 3. As a result, torque transmitted to the intermediate rotating body 44 causes not the first coil springs 41, but the second coil springs 43*a* and 43*b* on the inner peripheral side to be sequentially compressed between the intermediate rotating body 44 and the output rotating body 48. The first coil springs 41 are compressed between the first flywheel 2 and the intermediate rotating body 44 substantially simultaneously with the start of compression of the second coil spring 43*c*. Specifically, the first coil springs 41 and the second coil spring 43*c* are compressed in series by the intermediate rotating body 44. As the relative rotation of the first flywheel 2 and the second flywheel 3 proceeds further, the first stopper mechanism 55 and the second stopper mechanism 56 eventually operate to stop the relative rotation of the first flywheel 2 and the second flywheel 3.

Thus, the inputted torque is outputted through the first coil springs 41 (the first stopper mechanism 55), the intermediate rotating body 44, the second coil springs 43*a*, 43*b*, and 43*c* (the second stopper mechanism 56), the output rotating body 48, and the second flywheel 3 to the input shaft of the transmission and the clutch disk assembly (not shown).

2) Absorption and Damping of Torsional Vibration

When combustion fluctuations from the engine are inputted to the two-mass flywheel 1 while the clutch is engaged, in the case of relatively small torsional vibration in which the input torque is no more than the minimum operating torque of the first damper 8, the intermediate rotating body 44 and the output rotating body 48 rotate relatively in the damper mechanism 4, and the second coil springs 43*a* and 43*b* are compressed in parallel in two stages between these. Low hysteresis torque is generated at this point by the second friction generating mechanism 7.

In the case of large torsional vibration in which the input torque is greater than the minimum operating torque, the first coil springs 41 of the first damper 8 and the second coil spring 43*c* of the second damper 9 act in series in the damper mechanism 4. At this point relatively high hysteresis torque is generated by the first friction generating mechanism 5 in addition to what is generated by the second friction generating mechanism 7.

Torsional vibration in the damper mechanism 4 is absorbed and damped by the above actions.

3) Improving Inadequate Return

When the clutch is engaged, if the driver suddenly lifts off the accelerator pedal at high engine speeds, engine braking causes the damper mechanism to be driven backward, so that a large torsional vibration is inputted to the damper mechanism. At this point, since the elastic members on the outer peripheral side are not operated by centrifugal force with a conventional damper mechanism as discussed above, and this large torsional vibration cannot be absorbed and damped by the elastic members on the inner peripheral side, the result being that the damper mechanism does not return adequately.

However, with this damper mechanism 4, since the first coil springs 41 are accommodated in a pre-compressed state, even if the action of centrifugal force causes a high hysteresis torque to be generated by the first friction generating mechanism 5 at high engine speeds, a heavy load F1 from the first coil springs 41 will act between the first flywheel 2 and the second flywheel 3 in the direction of returning the flywheels 2 and 3 to their initial states. Therefore, this load F1 is able to overcome the hysteresis torque generated by the first friction generating mechanism 5, and this mitigates the problem of inadequate return of the damper mechanism 4 at high engine speeds.

4) Absorption and Damping of Large Torque Fluctuations

When resonance or the like produces large torque fluctuations, and large torsional vibration is generated, then the first damper 8 operates in addition to the operation of the second damper 9. More specifically, if the input torque exceeds the minimum operating torque of the first damper 8, the first coil springs 41 of the first damper 8 are compressed in series. In addition to this, relatively high hysteresis can be obtained from the first friction generating mechanism 5 even at low engine speeds when there is almost no centrifugal force. Specifically, with this damper mechanism 4, particularly at low engine speeds, damper characteristics of low stiffness, a wide torsion angle, and high hysteresis torque can be realized, and large torque fluctuations can be effectively absorbed and damped.

Also, even near a torsion angle of 0° at which only the second damper 9 operates, a relatively high hysteresis torque can be generated by the first friction generating mechanism 5 in addition to the hysteresis torque generated by the second friction generating mechanism 7 (see FIG. 7c). As a result, large torsional vibration can be effectively absorbed and damped more effectively, and the vibration damping performance of the damper mechanism 4 can be further enhanced.

5) Reducing Stopper Mechanism Damage and Striking Noise

If the relative rotation of the first flywheel 2 and the second flywheel 3 exceeds a specific angle, the second stopper mechanism 56 of the second damper 9 operates, and operation of the second damper 9 is stopped. Since the first damper 8 is operating at this point, torque generated by the first damper 8 softens the impact when the protrusions 48d and the stopper 35 collide, and this reduces damage to the stopper mechanism and the generation of striking noises.

(4) Other Embodiments

An embodiment of the damper mechanism pertaining to the present invention was described above, but the present invention is not limited to this embodiment, and various modifications and improvements are possible without departing from the scope of the present invention.

For example, embodiments of the damper mechanism pertaining to the present invention are not limited to the two-mass flywheel 1 discussed above, and the invention can also be applied to other devices that need to absorb and damp torque fluctuations and torsional vibration.

INDUSTRIAL APPLICABILITY

With the flywheel assembly and damper mechanism of the present invention, since the first elastic members are set in a state of having been compressed, a heavy load can be generated in the direction of returning the relative rotation of the first and second rotating members to the initial state. This affords adequate return of the damper mechanism at high engine speeds, and improves vibration damping performance. Therefore, the present invention is useful in the field of damper mechanisms with which better vibration damping performance is needed.

What is claimed is:

1. A damper mechanism for transmitting torque and for absorbing and damping torque fluctuations, comprising:
   a first rotating member;
   a second rotating member being configured and arranged to be relatively rotatable with respect to the first rotating member;
   a third rotating member being configured and arranged to be relatively rotatable with respect to the second rotating member;
   a first damper having a plurality of first elastic members elastically coupling the first rotating member and the second rotating member in the rotation direction; and
   a second damper elastically coupling the second rotating member and the third rotating member in the rotation direction, and being configured to begin operating at a torque that is lower than the minimum operating torque of the first damper,
   a plurality of first spring seats being sandwiched between ends of the first elastic members and the second rotating member,
   the second rotating member having a plurality of support components that support the ends of the first elastic members in the rotation direction,
   the plurality of support components supporting the first elastic member in a state of being compressed in the rotation direction,
   the first rotating member having a plurality of contact components disposed at locations corresponding to the support components in the rotation direction and configured to come into contact with the ends of the first elastic members, and a sliding component that is disposed on the outer peripheral side of the first elastic members and supports the first elastic members in the radial direction,
   gaps being formed in the rotation direction between the contact components and the ends of the first elastic members.

2. The damper mechanism according to claim 1, wherein the second damper has a plurality of second elastic members that is disposed on the inner peripheral side of the first elastic members and that elastically couples the second rotating member and the third rotating member in the rotation direction.

3. The damper mechanism according to claim 2, wherein the first damper begins operating during the operation of the second damper.

4. The damper mechanism according to claim 3, wherein two or more of the first elastic members are accommodated between adjacent support components in the rotation direction, and
the first elastic members are disposed in an arc shape in a state of being compressed between adjacent support components in the rotation direction.

5. The damper mechanism according to claim 4, further comprising:
   second spring seats supporting the first elastic members and slidably arranged with the sliding component, the second spring seats being disposed between the ends of adjacent first elastic members.

6. The damper mechanism according to claim 2, wherein two or more of the first elastic members are accommodated between adjacent support components in the rotation direction, and
the first elastic members are disposed in an arc shape in a state of being compressed between adjacent support components in the rotation direction.

7. The damper mechanism according to claim 6, further comprising:
   second spring seats supporting the first elastic members and slidably arranged with the sliding component, the second spring seats being disposed between the ends of adjacent first elastic members.

8. The damper mechanism according to claim 1, wherein the first damper begins operating during the operation of the second damper.

9. The damper mechanism according to claim 8, wherein two or more of the first elastic members are accommodated between adjacent support components in the rotation direction, and the first elastic members are disposed in an arc shape in a state of being compressed between adjacent support components in the rotation direction.

10. The damper mechanism according to claim 9, further comprising:

second spring seats supporting the first elastic members and slidably arranged with the sliding component, the second spring seats being disposed between the ends of adjacent first elastic members.

11. The damper mechanism according to claim 1, wherein two or more of the first elastic members are accommodated between adjacent support components in the rotation direction, and the first elastic members are disposed in an arc shape in a state of being compressed between adjacent support components in the rotation direction.

12. The damper mechanism according to claim 11, further comprising:

second spring seats supporting the first elastic members and slidably arranged with the sliding component, the second spring seats being disposed between the ends of adjacent first elastic members.

* * * * *